(12) United States Patent
Castro et al.

(10) Patent No.: US 7,996,391 B2
(45) Date of Patent: Aug. 9, 2011

(54) SYSTEMS AND METHODS FOR PROVIDING SEARCH RESULTS (75) Inventors: Luis Castro, Piscataway, NJ (US); Walt Lin, New York, NY (US); Benedict Gomes, Mountain View, CA (US)

(73) Assignee: Google Inc., Mountain View, CA (US)

( * ) Notice: Subject to any disclaimer, the term of this patent is extended or adjusted under 35 U.S.C. 154(b) by 707 days.

(21) Appl. No.: 11/155,882

(22) Filed: Jun. 20, 2005

(65) Prior Publication Data
US 2006/0287985 A1 Dec. 21, 2006

(51) Int. Cl.
*G06F 7/00* (2006.01)
*G06F 17/30* (2006.01)
*G06F 3/00* (2006.01)
*G06F 3/048* (2006.01)

(52) U.S. Cl. ........ 707/723; 707/725; 707/727; 715/760; 715/789

(58) Field of Classification Search .................. 707/3, 4, 707/5, 7, 999.003, 723, 725, 727; 715/734, 715/745, 760, 789
See application file for complete search history.

(56) References Cited

U.S. PATENT DOCUMENTS

| 6,285,999 | B1 * | 9/2001 | Page | 707/5 |
| 6,631,372 | B1 * | 10/2003 | Graham | 707/4 |
| 6,754,873 | B1 | 6/2004 | Law et al. | |
| 6,820,075 | B2 * | 11/2004 | Shanahan et al. | 707/3 |
| 6,957,390 | B2 * | 10/2005 | Tamir et al. | 715/734 |
| 7,231,395 | B2 * | 6/2007 | Fain et al. | 715/514 |
| 7,243,102 | B1 * | 7/2007 | Naam et al. | 707/7 |
| 7,287,214 | B1 * | 10/2007 | Jenkins et al. | 707/999.006 |
| 7,555,476 | B2 * | 6/2009 | Holbrook | 707/3 |
| 2006/0095424 | A1 | 5/2006 | Petropoulos et al. | |

FOREIGN PATENT DOCUMENTS

| JP | 11-328226 A | 11/1999 |
| JP | 2001-125931 A | 5/2001 |
| JP | 2001-209601 A | 8/2001 |
| JP | 2001-290728 A | 10/2001 |
| JP | 2002-149698 A | 5/2002 |
| JP | 2003-150436 A | 5/2003 |
| JP | 2004-021589 A | 1/2004 |
| JP | 2004-164290 A | 6/2004 |
| JP | 2005-063164 A | 3/2005 |
| WO | 01/27805 A2 | 4/2001 |
| WO | 01/46870 A1 | 6/2001 |

OTHER PUBLICATIONS

Ian Rogers, "The Google Pagerank Algorithm and How It Works", IPR Computing Ltd., May 16, 2002, pp. 1-17.
International Search Report, Oct. 20, 2006; 3 pages.
Wang et al., "A New Construct of Searchengine Architecture", Computer Engineering vol. 29 No. 11, Jul. 2003, 3 pages, English abstract.

* cited by examiner

*Primary Examiner* — Vincent Boccio
(74) *Attorney, Agent, or Firm* — Harrity & Harrity, LLP (57) ABSTRACT

A method includes generating search results in response to a user query, where at least one of the search results includes a group of links. The group of links may represent links to web pages within a same web site and may be identified based on at least one factor associated with the links. The method may also include providing the search results to the user.

27 Claims, 8 Drawing Sheets

SYSTEMS AND METHODS FOR PROVIDING SEARCH RESULTS

BACKGROUND OF THE INVENTION

1. Field of the Invention

Implementations described herein relate generally to information retrieval and, more particularly, to providing information associated with a search query.

2. Description of Related Art

The World Wide Web ("web") contains a vast amount of information. Locating a desired portion of the information, however, can be challenging. This problem is compounded because the amount of information on the web and the number of new users inexperienced at web searching are growing rapidly.

Search engine systems attempt to return hyperlinks to web pages in which a user is interested. Generally, search engine systems base their determination of the user's interest on search terms (called a search query) entered by the user. The goal of a search engine system is to provide links to high quality, relevant search results (e.g., web pages) to the user based on the search query. Typically, the search engine system accomplishes this by matching the terms in the search query to a corpus of pre-stored web pages. Web pages that contain the user's search terms are "hits" and are returned to the user as links.

When an existing search engine system returns search results, the search results often include links to web pages for various web sites. The user may then select one of the links to a particular web site to attempt to find the item of interest. The item of interest, however, may not be on the web page associated with the selected link. In this case, the user may navigate from this first web page to find the actual web page with the desired information. This may involve clicking through a number of web pages until the user is able to find the item of interest.

SUMMARY OF THE INVENTION

According to one aspect, a method may include receiving a search query from a user and generating search results based on the search query. The method may also include identifying a number of web pages associated with at least one of the search results based on a quality factor associated with the web pages, where the web pages and a web page associated with the at least one search result are in a same web site. The method may further include providing the search results and a plurality of links associated with the plurality of web pages to the user.

In another aspect, a computer-readable medium that stores instructions executable by at least one processor may be provided. The instructions may cause the processor to perform a method that may include receiving a search query from a user and generating first search results based on the search query. The method performed by the processor may also include identifying a number of links associated with at least one of the first search results based on at least one factor associated with the links. The method performed by the processor may further include forwarding second search results to the user, where the second search results include the first search results and the links associated with the at least one of the first search results, where the links correspond to web pages on a same web site.

In a further aspect, a system including a memory and a search engine may be provided. The memory may store a plurality of links. The search engine may receive a search query from a user and generate search results based on the search query. The search engine may also access the memory to identify a first group of links associated with a first one of the search results, where the first group of links is associated with a same web site. The search engine may further provide the search results and the first group of links to the user.

In still another aspect, a method may include generating a number of search results in response to a user query, where at least one of the search results includes a group of links sorted in an order based on at least one factor associated with the group of links. The method may also include providing the plurality of search results to the user.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description refers to the accompanying drawings. The same reference numbers in different drawings may identify the same or similar elements. Also, the following detailed description does not limit the invention.

Overview

Systems and methods consistent with the principles of the invention may provide a number of links associated with one or more particular search results. These links may represent web pages within the same website as the particular search result and may represent web pages that are determined to be web pages that a user may most likely access. These links may also include text that helps identify the corresponding web page. The user may then select one of these links without first selecting the link associated with the search result.

In the description to follow, the term "site" or "website" is to be broadly interpreted to include any domain or subdomain (e.g., google.com, labs.google.com, etc.) or a domain plus a uniform resource locator prefix (e.g., geocities.com/Athens/). In addition, the description to follow focuses on searches related to web sites. It should be understood, however, that implementations consistent with the invention are also applicable to searching documents or repositories of documents. The term "document" is to be broadly interpreted to include any machine-readable and machine-storable work product. A document may include, for example, a web page, information relating to a news event, an image file, information relating to a merchant product, information relating to a usenet page, a yellow page entry, a scanned book, a file, a combination of files, one or more files with embedded links to other files, a blog, a web advertisement, an e-mail, etc. Documents often include textual information and may include embedded information (such as meta information, hyperlinks, etc.) and/or embedded instructions (such as Javascript, etc.). A "link," as the term is used herein, is to be broadly interpreted to include any reference to/from a document from/to another document or another part of the same document.

Exemplary Network

Figure 1:
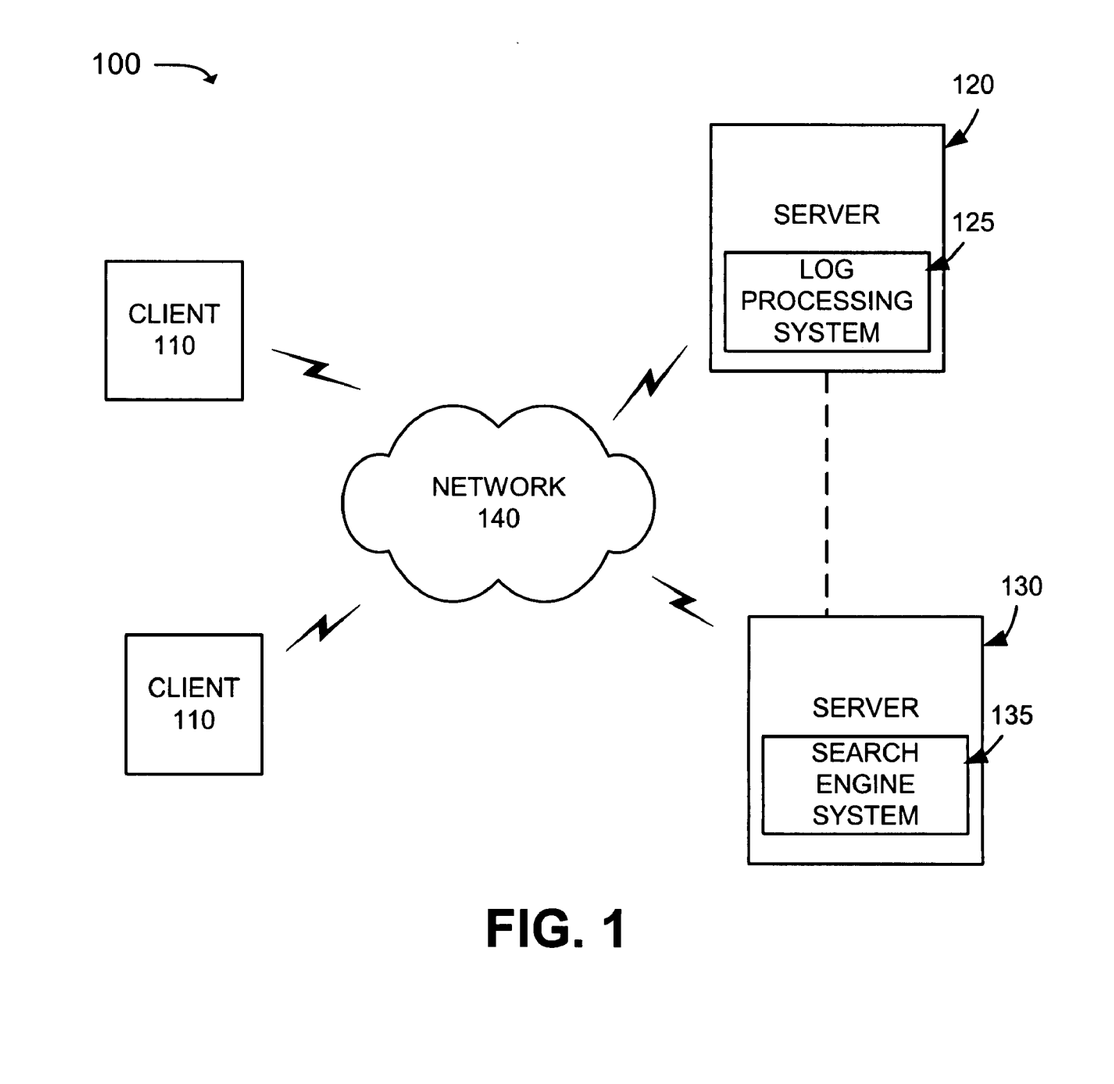
FIG. 1 is an exemplary diagram of a network in which systems and methods consistent with the principles of the invention may be implemented.

FIG. 1 is an exemplary diagram of a network 100 in which systems and methods consistent with the principles of the invention may be implemented. Network 100 may include clients 110 and servers 120 and 130 connected via network 140. Two clients 110, one server 120 and one server 130 have been illustrated as connected to network 140 in FIG. 1 for simplicity. In practice, there may be more or fewer clients and servers. Also, in some instances, a client may perform a function of a server and a server may perform a function of a client. Additionally, in alternative implementations, the functions performed by one server may be performed by another server or may be combined with the functions performed by another server. For example, server 120 may perform the functions of both servers 120 and 130, or vice versa.

Clients 110 may include client entities. An entity may be defined as: (1) a device, such as a personal computer, a wireless telephone, a personal digital assistant (PDA), a lap top computer, or another type of computation or communication device; (2) a thread or process running on one of these devices; and/or (3) an object executable by one of these devices.

Server 120 may include one or more server entities that gather, process, maintain, and/or manage information. In an exemplary implementation consistent with principles of the invention, server 120 may include log processing system 125 that processes and stores information associated with, for example, web page accesses, such as click-related information, associated with clients' 110 access of web pages.

Server 130 may include one or more server entities that gather, process, search, maintain, manage documents and/or provide search results to users. In an exemplary implementation consistent with principles of the invention, server 130 may include search engine system 135 usable by clients 110. Search engine system 135 may receive search queries from clients 110 and return relevant information to clients 110.

Network 140 may include a local area network (LAN), a wide area network (WAN), a telephone network, such as the Public Switched Telephone Network (PSTN), an intranet, the Internet, a different type of network, or a combination of networks. Clients 110 and servers 120 and 130 may connect to network 140 via wired, wireless, or optical connections. In alternative implementations, one or more of the devices illustrated in FIG. 1 may be directly connected to another one of the devices. For example, in one implementation consistent with the principles of the invention, server 120 may be directly connected to server 130, as illustrated by the dotted line in FIG. 1.

Exemplary Server Architecture

Figure 2:
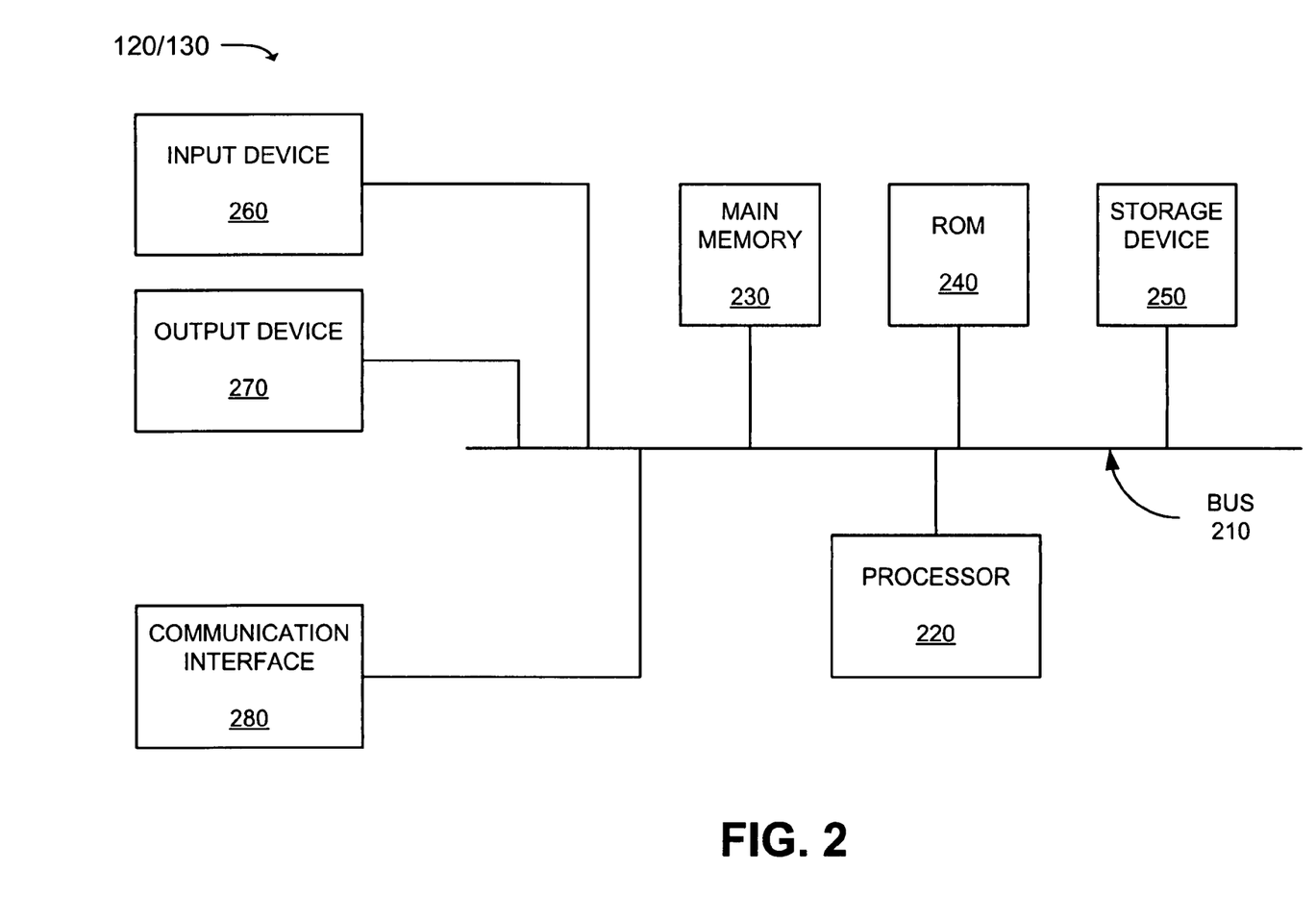
FIG. 2 is an exemplary diagram of a server in the network of FIG. 1 in an implementation consistent with the principles of the invention.

FIG. 2 is an exemplary diagram of server 120 in an implementation consistent with the principles of the invention. Server 130 may be configured in a similar manner. Server 120/130 may include a bus 210, a processor 220, a main memory 230, a read only memory (ROM) 240, a storage device 250, one or more input devices 260, one or more output devices 270, and a communication interface 280. Bus 210 may include a path that permits communication among the components of server 120/130.

Processor 220 may include any type of conventional processor, microprocessor or processing logic that interprets and executes instructions. Main memory 230 may include a random access memory (RAM) or another type of dynamic storage device that stores information and instructions for execution by processor 220. ROM 240 may include a conventional ROM device or another type of static storage device that stores static information and instructions for use by processor 220. Storage device 250 may include a magnetic and/or optical recording medium and its corresponding drive.

Input device 260 may include one or more conventional mechanisms that permit a user to input information to server 120/130, such as a keyboard, a mouse, a pen, voice recognition and/or biometric mechanisms, etc. Output device 270 may include one or more conventional mechanisms that output information to the user, such as a display, a printer, a speaker, etc. Communication interface 280 may include any transceiver-like mechanism that enables server 120/130 to communicate with other devices and/or systems. For example, communication interface 280 may include mechanisms for communicating with another device or system via a network, such as network 140.

Server 120, consistent with the principles of the invention, may store data associated with individual web pages within particular web sites and generate web site mapping information associated with web sites. Server 130, consistent with the principles of the invention, may perform searches based on inputs from clients 110 and access information stored in server 120. Server 120/130 may perform these operations in response to processor 220 executing software instructions contained in a computer-readable medium, such as memory 230. A computer-readable medium may be defined as one or more memory devices.

The software instructions may be read into memory 230 from another computer-readable medium, such as data storage device 250, or from another device via communication interface 280. The software instructions contained in memory 230 causes processor 220 to perform processes that will be described later. Alternatively, hardwired circuitry may be used in place of or in combination with software instructions to implement processes consistent with the principles of the invention. Thus, implementations consistent with the principles of the invention are not limited to any specific combination of hardware circuitry and software.

In addition, server 120 and server 130 are illustrated in FIG. 1 as being single devices. It should be understood, however, that server 120 and server 130 may each be implemented as a network of computer processors and/or servers.

Figure 3:
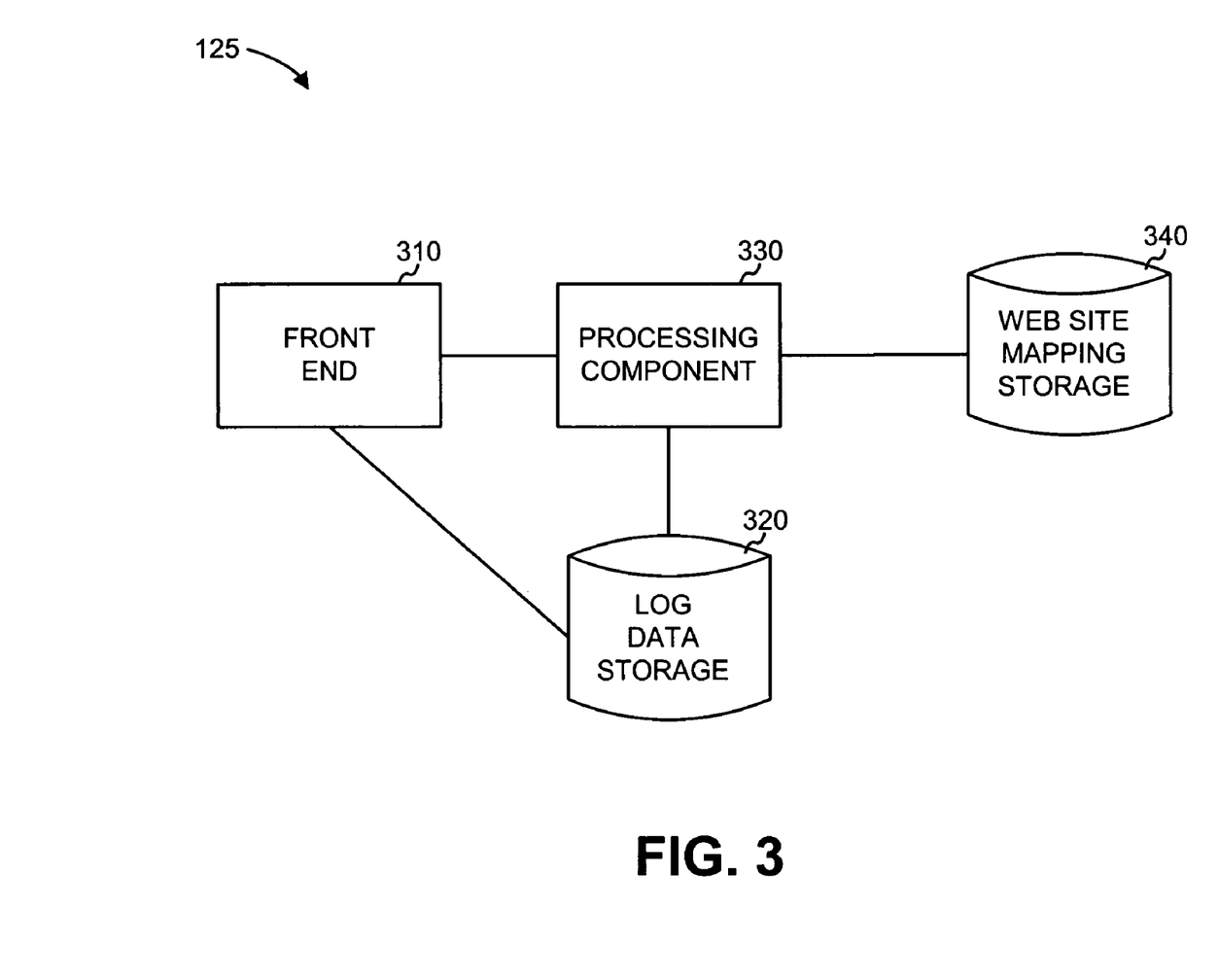
FIG. 3 is an exemplary functional block diagram illustrating the log processing system of FIG. 1 in an implementation consistent with the principles of the invention.

FIG. 3 is an exemplary functional block diagram of log processing system 125, according to an implementation consistent with principles of the invention. Log processing system 125 may include a front end (FE) 310, log data storage 320, a processing component 330 and web site mapping storage 340. The logical blocks illustrated in FIG. 3 may be implemented in software, hardware, or a combination of hardware and software. In addition, each of the functional blocks may represent one or more computer processors, threads, and/or objects. It should also be understood that in alternative implementations, the functions performed by one of the logical blocks in FIG. 3 may be performed by another logical block. Further, in alternative implementations, a single logical block/processing device may perform the functions of log processing system 125.

FE 310 acts as the front end of log processing system 125 and receives information associated with clients' 110 access of various web pages/sites, such as click information. For example, FE 310 may receive hypertext transfer protocol (HTTP) requests when a client 110 accesses a web page. FE 310 may forward this information to log data storage 320.

Log data storage 320 may store data associated with clients' 110 access of various web pages and/or sites. For example, log data storage 320 may include information representing web pages that have been accessed by clients 110, such as hyperlinks associated with the web pages. Log data storage 320 may also store information indicating a total number of times each of the web pages corresponding to the hyperlinks have been accessed by clients 110 and/or an amount of time (e.g., average) clients 110 have stayed on each of the web pages. Log data storage 320 may further include information representing the number of links (e.g., from various other web pages) that point to each particular web page identified in log data storage 320. Alternatively, or in addition to the information described above, log data storage 320 may include information indicating whether a typical client 110 scrolled through the web pages identified in log data storage 320 or linked out of the web pages without scrolling. In still further alternatives, or in addition to the information described above, log data storage 320 may store information retrieval scores associated with each web page identified in log data storage 320, where the information retrieval score indicates how closely a particular search query matches information on the web page. In still other alternatives or in addition to the information described above, log data storage 320 may store information identifying the likelihood that a typical client 110 will make a purchase associated with an item displayed on a web page. The likelihood that a purchase will be made may be provided by an entity (e.g., a company) associated with the particular web page or may be provided from user logs. In each case, the information stored in log data storage 320 may be used to determine a quality measure associated with a number of web pages in a particular web site, as described in more detail below.

Processing component 330 may analyze the information in log data storage 320 and generate web site mapping data/tables. For example, processing component 330 may use the information in log data storage 320 to rank particular web pages within a single web site based on a quality factor. The quality factor may be based on any of a number of metrics described above, or a combination of the metrics described above. For example, in one implementation, processing component 330 may rank web pages based on a number of times each web page has been accessed, as recorded in log data storage 320. In another implementation, processing component 330 may rank web pages based on the number of links in other web pages that point to the respective web pages stored in log data storage 320. In each case, processing component 330 may store the ranked or ordered lists in web site mapping storage 340.

Figure 4:
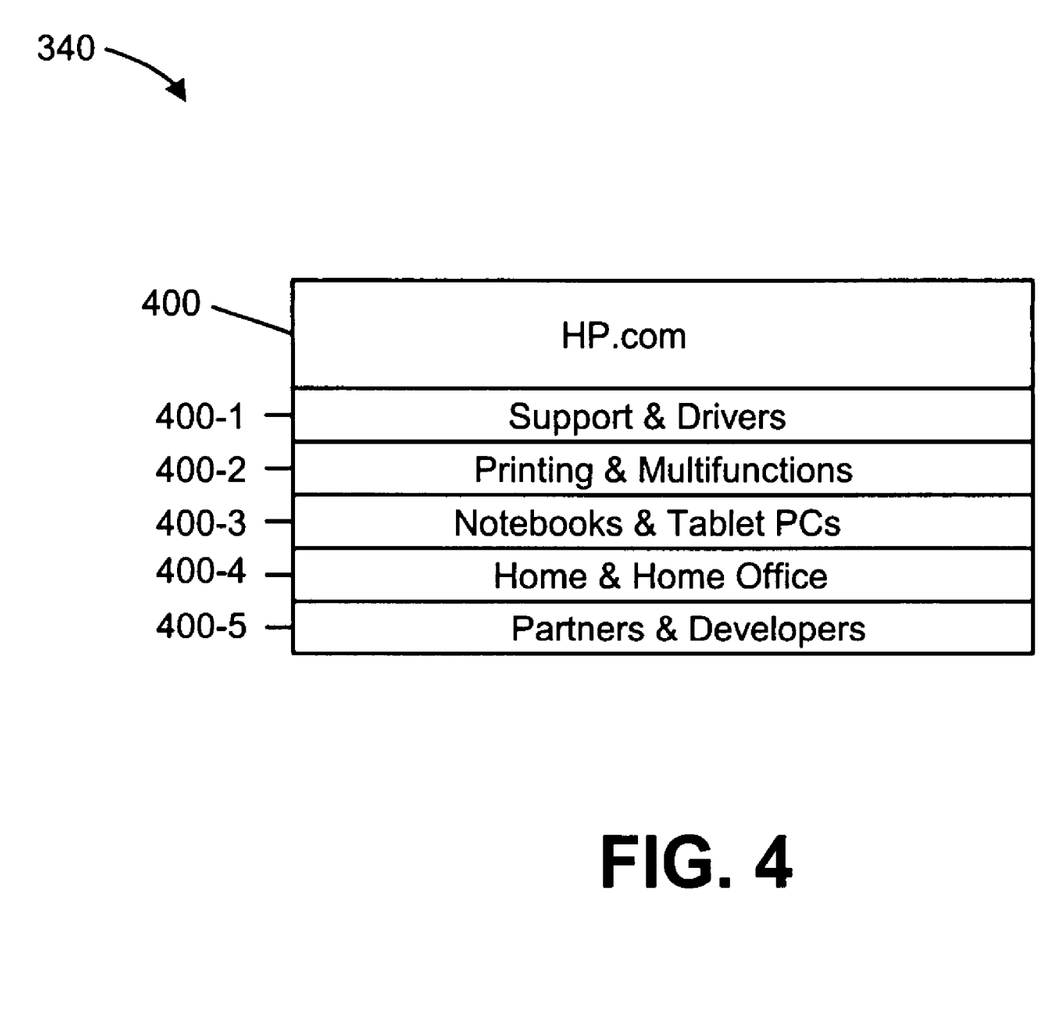
FIG. 4 illustrates an exemplary portion of the web site mapping storage of FIG. 3 in an implementation consistent with the principles of the invention.

Web site mapping storage 340, as described above, may include a list of web sites and ranking of web pages within the respective web sites. For example, FIG. 4 illustrates an exemplary portion of web site mapping storage 340. Referring to FIG. 4, web site mapping storage 340 may include an entry 400 and a number of sub-entries 400-1 through 400-5 associated with entry 400. In the example illustrated in FIG. 4, entry 400 stores "HP.com" representing a web site associated with Hewlett Packard. Sub entries 400-1 through 400-5 store Support & Drivers, Printing & Multifunctions, Notebooks & Tablet PCs, Home & Home Office and Partners & Developers, respectively. Sub-entries 400-1 through 400-5 may be stored in an order representing the determined quality associated with the corresponding web pages in the web site www.hp.com. For example, entry 500-1 (i.e., Support & Drivers) may represent a most popular web page on the web site www.hp.com (as indicated by, for example, information stored in log data storage 320), followed by Printing & Multifunctions in entry 400-2, through entry 400-5 (i.e., Partners & Developers), which may represent the fifth most popular web page on the web site identified in field 400. Web site mapping storage 340 may store similar information for a number of other web sites. In this example, entries 400-1 through 400-5 may be based on the number of times log data storage 320 received information indicating that clients 110 have accessed these web pages. As discussed above, however, the ranking/ordering of web pages within a particular web site may be based on any number of other factors or combination of factors. In each case, the web site mapping information associated with web pages within a particular web site may represent a quality measure associated with the web pages. The quality measure may represent a popularity associated with a web page, a likelihood that the information on a web page will be accessed by a user, a likelihood that the information will be useful to a user submitting a search query or may represent other factors associated with the quality of a web page.

Figure 5:
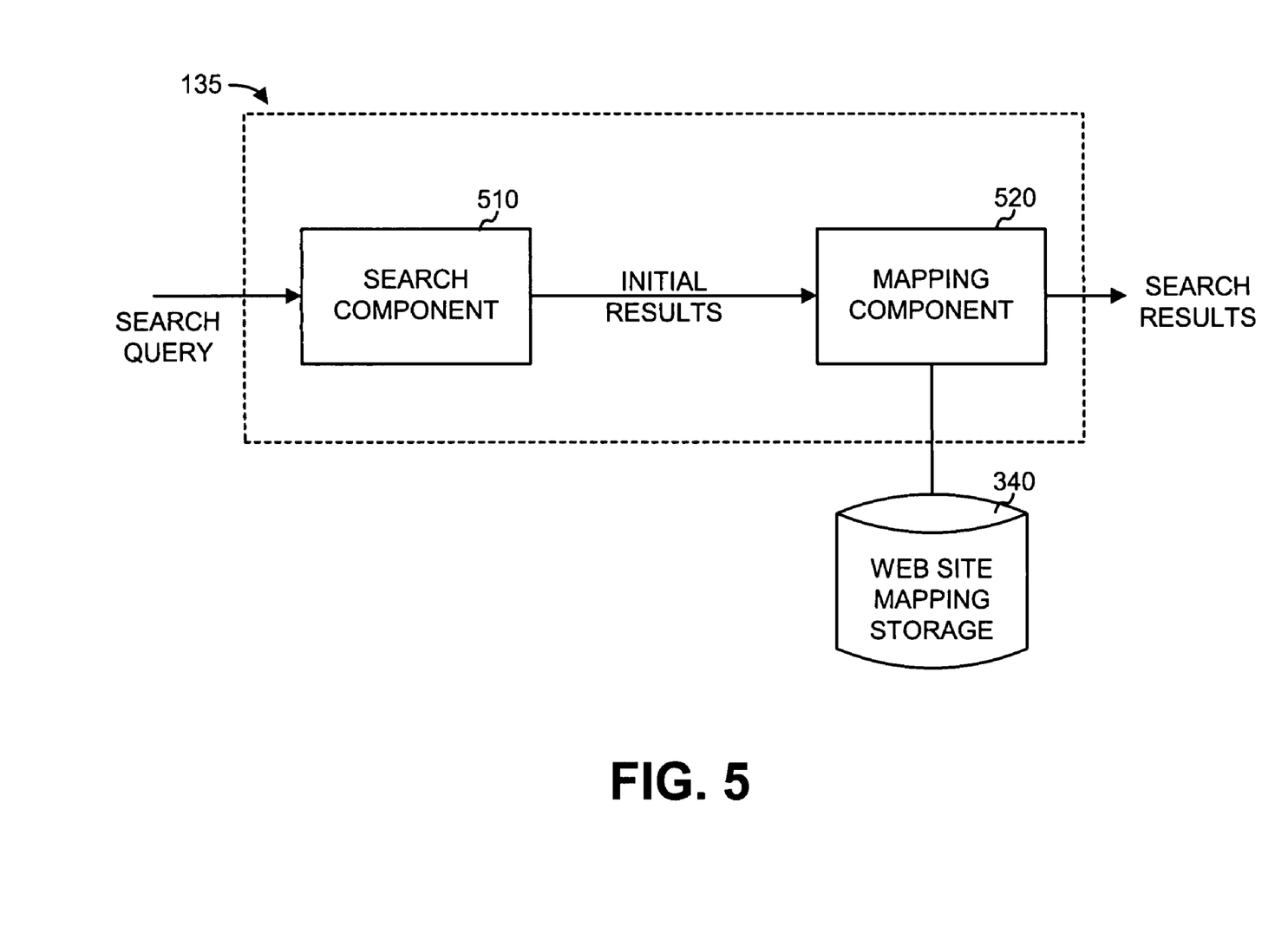
FIG. 5 is an exemplary functional block diagram illustrating the search engine system of FIG. 1 in an implementation consistent with the principles of the invention.

Search engine system 135 (FIG. 1) may use the information in web site mapping storage 340 to provide search results with links to one or more web pages associated with a particular search result. Referring to FIG. 5, in an exemplary implementation, search engine system 135 may include a search component 510 and a mapping component 520. Search component 510 may receive a search query from a client 110. Search component 510 may then generate initial search results that identify relevant documents based on the search query.

Mapping component 520 may receive the initial search results from search component 510 and access web site mapping storage 340 to determine whether any of the search results have associated mapping information stored in web site mapping storage 340. For those search results that have mapping information stored in web site mapping storage 340, mapping component 520 may include all or some of the mapping information associated with the initial search results. Search engine system 135 may then forward the search results and mapping information to the client 110 that submitted the original search query, as described in more detail below.

Exemplary Processing

Figure 6:
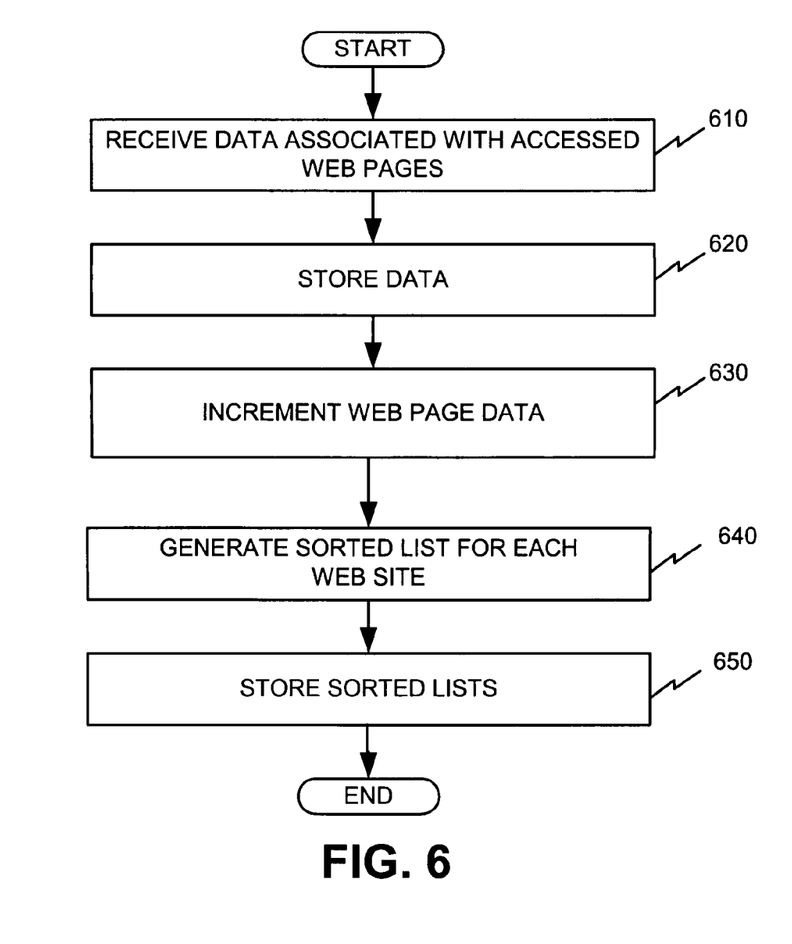
FIG. 6 is a flow diagram illustrating exemplary processing associated with generating web site mapping information consistent with the principles of the invention.

FIG. 6 is a flow diagram illustrating exemplary processing for generating web site mapping information consistent with the principles of the invention. The following description focuses on one or more servers that receive information associated with clients' 110 access of web pages and provide information to clients 110. It will be appreciated that the techniques described herein are equally applicable to any server(s) that provides information to a user based on a quality measure, such as a popularity measure or a likelihood of use measure associated with web pages or other information, and indeed to any system in which the quality of information provided to a user is important. For example, the techniques described herein are applicable to providing information to a user based on a search query associated with searching books, periodicals, image data or other information stored in one or more databases or repositories.

Processing may begin by log processing system 125 receiving data via network 140 (act 610). For example, front end 310 may receive data when clients 110 access various web sites. In one implementation, assume that users have downloaded/installed a toolbar on their respective clients 110 that facilitates web searches on a search engine, such as search engine system 135. In this case, the toolbar may include software code that instructs a client 110 to send hypertext transfer protocol (HTTP) requests to server 120 for each web page that client 110 accesses. FE 310 may use the information in the HTTP request to identify the particular web page and web site associated with the web page that client 110 has accessed. Alternatively, FE 310 may receive similar data when clients 110 click on links provided by search engine system 135. In addition, the information received from clients 110 may enable FE 310 to identify other information associated with web site accesses, such as an amount of time a client 110 accesses a particular web page, whether client 110 scrolled through the particular web page, whether a purchase was made via the particular web page, etc.

FE 310 may store the web page information, such as a hyperlink or a uniform resource locator (URL) associated with the accessed web pages, in an indexed format in log data storage 320 (act 620). For example, suppose that the user visits a web site for Apple Computer and clicks on a number of links accessible via the Apple Computer home page, such as a web page associated with PCs, a web page associated with the Apple online store, etc. For each web page that is accessed, FE 310 may receive an HTTP request, identify a hyperlink associated with the request and store the hyperlink of the web page. FE 310 may store the hyperlink under an entry for the home page associated with the hyperlink (i.e., Apple.com in this example). FE 310 may also store text associated with the hyperlink, such as the name of the web page provided with the HTTP request. Alternatively, FE 310 may store anchor text with the hyperlink, such as text displayed on a hyperlink used to access the web page from another page on the website (e.g., the home page). In still another alternative, FE 310 may store text that is located on the web page itself with the corresponding hyperlink (e.g., information located at the top of the web page that may represent a title of the web page).

In an exemplary implementation, each time a particular one of the web pages stored in log data storage 320 is accessed by any of clients 110, FE 310 may increment an index value associated with the particular web page (act 630). This index value may represent the number of times a particular web page has been accessed and may function as a quality measure associated with the particular web page. That is, a web page that has been accessed more often is more likely to contain useful information to a user. It should be understood that processing component 330 may generate the sorted list based on a number of other factors or combination of factors, as described above.

Processing component 330 may then generate a sorted or ranked list based on the particular quality factor (act 640). In the example discussed above, the quality factor may be based on the number of times each web page within a particular web site has been visited by clients 110, as recorded by log data storage 320. This metric may help identify web pages that are most likely to contain valuable information to the users of clients 110.

Processing component 330 may then store the sorted/ranked list in web site mapping storage 340 (act 650). Processing component 330 may generate similar sorted lists for each of the other web sites stored in log data storage 320 and store these ranked lists in web site mapping storage 340 (act 650). Search engine system 135 may then use the web site mapping information when providing search results to clients 110.

Figure 7:
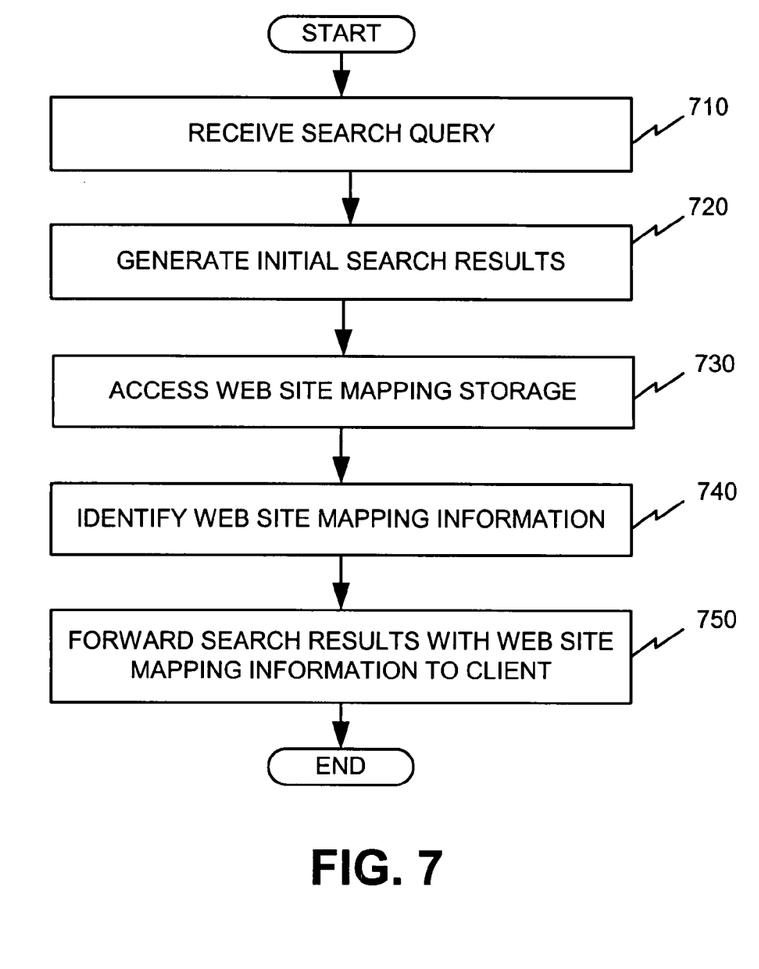
FIG. 7 is a flow diagram illustrating exemplary processing associated with providing search results in an implementation consistent with the principles of the invention.

FIG. 7 illustrates exemplary processing associated with providing search results, consistent with the principles of the invention. The processing described below uses the example of providing search results via a network, such as network 140. The techniques described herein, however, may be used in any search system including a local search system. Processing may begin with a client 110 accessing server 130 via network 140 and receiving a user interface (UI) for entering a search query. Alternatively, as discussed above, client 110 may have a toolbar associated with search engine system 135 loaded on client device 110 that facilitates entry of search queries.

Assume that the user enters a search query via client 110 and transmits the search query to server 130 via network 140. Search engine system 135 may receive the search query (act 710). In an exemplary implementation, search component 510 receives the search query, executes the search and generates a list of initial search results (act 720). These initial search results may include advertisements based on the search query.

After search component 510 has generated the initial search results, including advertiser related information, the initial results are forwarded to mapping component 520. Mapping component 520 may then access web site mapping storage 340 to determine whether any of the search results are associated with web page information stored in web site mapping storage 340 (act 730). For example, assume that a query from one of clients 110 is "hp." In this case, further assume that web site mapping storage 340 includes a list of web pages associated with Hewlett Packard's web site, such as the sorted list illustrated in FIG. 4. In this case, mapping component 520 identifies the sorted list (i.e., entries 400-1 through 400-5) as being associated with the search result for Hewlett Packard. Mapping component 520 may perform a similar search for each of the initial search results and identify the web site mapping information for each search result that includes information stored in web site mapping storage 340 (act 740). In situations in which a web site's home page is not identified by the initial search result, a web site identifier (e.g., entry 400 in FIG. 4) may be identified from the initial search result and may be stored as an index to the other web pages located on the same web site.

In an exemplary implementation, mapping component 520 may only identify a predetermined number of links (e.g., five or less) from web site mapping storage 340 for inclusion with each particular search result. This predetermined number may represent the highest quality links. It should be understood, however, that any number of links (e.g., more than five) stored in web site mapping storage 340 may be provided with a particular search result. In addition, in some implementations, links stored in web site mapping storage 340 may be provided with only a predetermined number (e.g., ten) of the search results.

For search results that may not be associated with a web site that has a number of web pages, mapping component 520 may not identify any information stored in web site mapping storage 340 for that particular search result. In this case, the search result generated by search component 510 will not include any additional web page information or hyperlinks. In addition, if none of the search results includes information in web site mapping storage 340, the initial search results generated by search component 510 will be provided to client 110.

After mapping component 520 has identified the appropriate web site mapping information associated with the initial search results, search engine system 135 may forward the search results with the identified web site mapping information to client 110 (act 750). That is, the search results forwarded to client 110 will include the initial search results generated by search component 510 at act 720 and the additional information identified by mapping component 520 at act 740.

Figure 8:
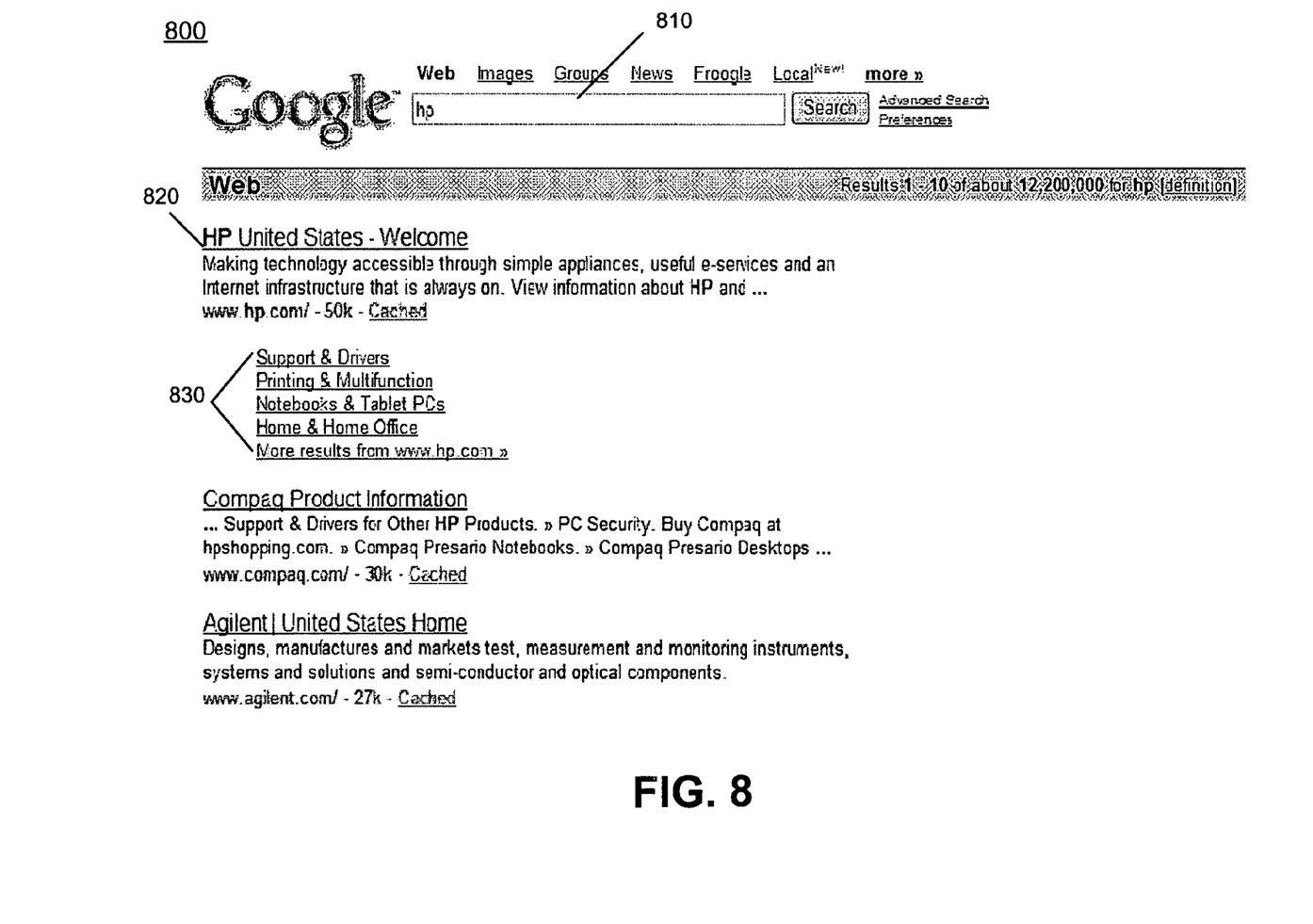
FIG. 8 illustrates an exemplary interface screen provided to a user in an implementation consistent with the principles of the invention.

For example, FIG. 8 illustrates an exemplary search results screen 800 provided to client 110. Referring to FIG. 8, assume that the search query submitted by client 110 to search engine system 135 was "hp", as indicated at box 810. In this case, search engine system 135 may identify a number of hits associated with the search query. Only three search results are illustrated in FIG. 8 for simplicity. Referring to FIG. 8, the first hit provided on screen 800 at area 820 is associated with www.hp.com (i.e., Hewlett Packard's home page) and includes a hyperlink to www.hp.com.

In addition, the search result associated with HP.com includes five additional links provided at area 830. The first four of these five additional links correspond to web pages/links that were identified by mapping component 520 at act 740. In an exemplary implementation, these links may correspond to the four most visited web pages within www.hp.com that were stored in web site mapping storage 340 (e.g., Support & Drivers, Printing & Multifunction, Notebooks & Tablet PCs, Home & Home office). As described previously, these links may include anchor text provided on the website www.hp.com for linking to these web pages (e.g., Support & Drivers, Printing & Multifunction, Notebooks & Tablet PCs, Home & Home office). Alternatively, the text provided in area 830 may include the URL associated with the web page or text located on the web page itself. In each case, the text may make it easier for the user to ascertain what information will be included in the corresponding web page and may save time associated with accessing web pages that are of no interest. The text and hyperlink allow the user to select the particular link without first going to a web page associated with the initial search result (e.g., a home page) and navigating through a number of pages until the user finds the particular web page of interest. In other words, the user at client 110 may bypass the link at area 820 and immediately select the link at area 830 that he/she believes provides the desired information. This may save considerable time associated with finding items of interest, especially in situations where the first accessed web page is confusing and difficult to navigate from to find a link to the desired web page of interest.

The fifth link at area 830 (i.e., "More results from www.hp.com" in this example) may be used to indicate that additional links associated with Hewlett Packard's web site may be available. For example, as described above with respect to FIG. 4, a link for Partners & Developers (entry 400-5) may be stored in web site mapping storage 340 for Hewlett Packard's web site, which is not displayed in area 830. In an exemplary implementation, when the link "More results from www.hp.com" is selected, a search page associated with searching the website associated with the link in area 820 may be provided to client 110. The user may then enter a new query and search engine system 135 will dynamically generate new results based on the new query, where each of the results are links to web pages in the web site associated with the search result at area 820. In alternative implementations, selecting the link "More results from www.hp.com" may simply provide the additional links stored in web site mapping storage 340 (e.g., Partners & Developers) to client 110. This additional number of links may also be set to a predetermined number.

In alternative implementations, search results screens provided to client 110 at act 750 may provide an icon or link that displays the term "Site Map" or similar designation with the search results. For example, instead of providing the links at area 830, the search results screen may provide an icon or link for "Site Map" at area 830. When the user at client 110 selects this icon or link or hovers a mouse over this icon or link, the additional links stored in web site mapping storage 340 may be displayed to the user via an overlay window or via a new interface screen that displays the additional links. Using an icon or link instead of providing the additional links may save space on the search results page and allow more search results to be displayed. In still further alternatives, a toolbar button associated with a site mapping function may be provided on a toolbar associated with client 110. The toolbar button may be associated with a toolbar that facilitates entry of search queries to search engine system 135. The toolbar button, when selected, may similarly provide the list of additional links. Using such a toolbar button may save additional space on the search results page.

CONCLUSION

Implementations consistent with the principles of the invention may include web site mapping information with search results. This additional information may be based on any quality measure and may allow the user to find the information of interest more quickly. In addition, the process for providing the web site mapping information to the user may be performed in a manner that is transparent to the user.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention. For example, while series of acts have been described with regard to FIGS. 6 and 7, the order of the acts may be varied in other implementations consistent with the present invention. Moreover, non-dependent acts may be implemented in parallel.

Also, implementations consistent with principles of the invention have been described with respect to gathering and storing information associated with clients' 110 access of web sites. In other implementations, instead of considering all web pages in a web site, the web site mapping information stored in web site mapping storage 340 may be limited to web pages that are linked to the web page associated with the initial search result.

In still other implementations, web site providers may provide search engine system 135 with a list of favored web pages within their own web site. For example, a web site provider may instruct the search engine provider (e.g., the provider associated with search engine system 135) to provide the list of links to the favored web pages when the search engine generates a search result that identifies the web site provider's web site. This list of links may be based on the web site provider's particular preference and knowledge of their own site. For example, the web site provider may want users to access web pages that will more likely result in a purchase. Providing a list of links/web pages by a web site provider may eliminate the need for some of the tracking performed by log processing system 125.

In addition, in alternative implementations, log processing system 125 may track actions performed by each particular client 110 with respect to that client's 110 history of accessing various web sites. In this case, the web site mapping storage 340 may rank the web pages within a web site based on the particular client's 110 user history and the web site mapping information may be different for each particular client 110.

In still further implementations, the links provided with particular ones of the search results (e.g., at area 830 in FIG. 8) may not be initially provided with the search results. In such implementations, the links may be provided after a search result has been clicked. This may be useful in situations where the destination site does not include a site map or the site map provided is confusing or difficult to navigate. In addition, in some implementations, a separate window could automatically be popped to the user after a search result has been clicked. This window may include the list of additional links. In still further implementations, the user at client 110 may be queried as to whether he/she would like to see a site map (i.e., the list of links from web site mapping storage 340) before the additional links are provided.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects were described without reference to the specific software code—it being understood that one of ordinary skill in the art would be able to design software and control hardware to implement the aspects based on the description herein.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. One or more non-transitory memory devices that store instructions executable by at least one processor to perform a method comprising:
   storing web page information for each particular web site of a plurality of different web sites, the web page information, for the particular web site, including information regarding a plurality of web pages from a domain associated with the particular web site, the information regarding the plurality of web pages being stored based on at least one factor that reflects a quantity of times that the plurality of web pages has been accessed by a plurality of users or an amount of time that the plurality of users spent accessing the plurality of web pages;
   receiving a search query from a client device;
   performing a search to identify search results based on the search query, where a plurality of the search results corresponds to web pages that are associated with a plurality of web sites, where at least two of the plurality of web sites are associated with different domains;
   identifying one of the web pages as an identified web page that corresponds to one of the plurality of search results;
   identifying a web site, of the plurality of web sites, as an identified web site with which the identified web page is associated;
   reading the web page information associated with the identified web site, the web page information identifying a plurality of web pages from the domain associated with the identified web site; and
   providing information regarding the plurality of search results for presentation on a display of the client device, where the information regarding the plurality of search results includes, for the one of the plurality of search results, information regarding the plurality of web pages from the domain associated with the identified web site.

2. The one or more memory devices of claim 1, further comprising:
   determining an order, in which the information regarding the plurality of web pages is presented on the display of the client device, based on the at least one factor associated with each of the plurality of web pages.

3. The one or more memory devices of claim 1, where the information regarding the plurality of web pages comprises links to the plurality of web pages.

4. The one or more memory devices of claim 1, where identifying the web site includes:
   determining a web site identifier from information associated with the identified web page, the web site identifier corresponding to a home page of the identified web site, and
   storing the web site identifier as an index to other web pages associated with the identified web site.

5. A system, comprising:
   a non-transitory memory device to store web page information for each particular web site of a plurality of different web sites, the web page information, for the particular web site, including a plurality of links to a corresponding plurality of web pages from a domain associated with the particular web site, the plurality of links to the corresponding plurality of web pages being stored based on a quantity of times that the corresponding plurality of web pages has been accessed by a plurality of users; and
   a search engine to:
      receive a search query from a user,
      perform a search to generate search results based on the search query, where a plurality of the search results correspond to web pages that are associated with a plurality of web sites, where at least two of the plurality of web sites are associated with different domains,
      identify one of the web pages as an identified web page that corresponds to one of the plurality of search results,
      identify a particular one of the plurality of web sites with which the identified web page is associated,
      access the memory device to identify a group of links, of the plurality of links, associated with the particular one of the plurality of web sites, each link, in the group of links, corresponding to a respective web page,
      determine an order for the group of links based on the quantity of times that each of the respective web pages has previously been accessed, and
      provide the search results and the group of links, in the determined order, to the user.

6. The system of claim 5, where, when determining an order for the group of links, the search engine orders the group of links based on an estimation as to whether the user will access the respective web page corresponding to each of the respective links.

7. The system of claim 5, where the search results and the group of links are provided to the user for output via a user interface, the order for the group of links is further based on a measure of quality of each link in the group of links.

8. The system of claim 5, where, when identifying the particular one of the plurality of web sites, the search engine is to:
   determine a web site identifier from information associated with the identified web page, the web site identifier corresponding to a home page of the particular one of the plurality of web sites, and
   storing the web site identifier as an index to other web pages associated with the particular one of the plurality of web sites.

9. A method performed by one or more server devices, comprising:
   collecting information regarding accesses of web pages, corresponding to a plurality of different web sites, by a plurality of users;
   storing, in a memory, web page information for each particular web site of the plurality of different web sites, the web page information, for the particular web site, identifying a domain associated with the particular web site and information regarding a plurality of web pages from the domain associated with the particular web site, the information regarding the plurality of web pages being stored, for each web page of the plurality of web pages, based on a quality factor that reflects a number of times that the web page has been accessed by the plurality of users;
   receiving, by one or more processors of the one or more server devices, a search query from a user via a client device;
   performing, by one or more processors of the one or more server devices, a search, based on the search query, to generate search results, where a plurality of the search results correspond to a plurality of web sites associated with a plurality of different domains;
   identifying, by one or more processors of the one or more server devices, one of the plurality of web sites as an identified web site corresponding to one of the plurality of search results;
   determining, by one or more processors of the one or more server devices, whether the memory stores web page information for the identified web site;
   identifying, from the memory, the plurality of web pages from the domain associated with the identified web site based on the quality factors associated with the plurality of web pages when the memory stores web page information for the identified web site; and
   providing, by one or more processors of the one or more server devices, the search results for presentation on a display of the client device, where providing the search results includes:
      providing the one of the plurality of search results and a plurality of links to web pages, of the plurality of web pages from the domain associated with the identified web site, when the memory stores web page information for the identified web site, and
      providing the one of the plurality of search results without links to web pages, of the plurality of web pages from the domain associated with the identified web site, when the memory does not store web page information for the identified web site.

10. The method of claim 9, further comprising:
   storing, for each of the plurality of web pages, link information associated with the web page.

11. The method of claim 10, further comprising:
   sorting the link information for the plurality of web pages based on the number of times that the plurality of web pages has been accessed.

12. The method of claim 9, where the providing the one of the plurality of search results and the plurality of links to the web pages includes:
   providing the plurality of links, for presentation on the display of the client device, in an order where a link to a more frequently accessed one of the web pages is presented higher in the order than a link to a less frequently accessed one of the web pages.

13. The method of claim 9, where the quality factor is further based on an amount of time spent by the plurality of users when accessing each of the plurality of web pages.

14. The method of claim 9, where the quality factor is further based on a number of web pages with a link pointing to one of the plurality of web pages.

15. The method of claim 9, where the quality factor is further based on items purchased via each of the plurality of web pages.

16. The method of claim 9, where the quality factor is further based on prior behavior, of the plurality of users, with respect to the plurality of web pages.

17. The method of claim 9, where providing the one of the plurality of search results and the plurality of links to the web pages comprises:
   including text with each respective link of the plurality of links, the text comprising text located on the web page corresponding to the respective link.

18. The method of claim 9, where providing the one of the plurality of search results and the plurality of links to the web pages comprises:
   presenting text with each of the plurality of links.

19. The method of claim 9, where providing the one of the plurality of search results and the plurality of links to the web pages comprises:
   providing the plurality of links for presentation on the display of the client device below presentation of the one of the plurality of search results on the display of the client device.

20. The method of claim 9, further comprising:
   receiving information from a provider of one of the plurality of different web sites, the information identifying the plurality of web pages associated with the one of the plurality of different web sites.

21. A system, comprising:
   one or more computer devices comprising:
      means for storing web page information for each particular web site of a plurality of different web sites, the web page information, for the particular web site, including information regarding a plurality of web pages from a domain associated with the particular web site, where the information regarding the plurality of web pages is stored, for each web page of the plurality of web pages from the domain associated with the particular web site, based on a quality factor that reflects a number of times that the web page has been accessed by a plurality of users;
      means for receiving a search query from a user via a client device;

means for performing a search, based on the search query, to generate search results, where a plurality of the search results corresponds to a plurality of web sites associated with a plurality of different domains;

means for identifying one of the plurality of web sites as an identified web site corresponding to one of the plurality of search results;

means for determining that web page information is stored for the identified web site;

means for identifying, from the web page information, a set of web pages from the domain associated with the identified web site based on the quality factors associated with the set of web pages when the web page information is stored for the identified web site; and means for providing the search results for presentation on a display of the client device, where the means for providing the search results includes means for providing the one of the plurality of search results and a plurality of links to the web pages, in the set of web pages from the domain associated with the identified web site, when the web page information is stored for the identified web site.

22. The system of claim 21, where the one or more computer devices further comprise:

means for receiving information when one of the plurality of web pages is accessed; and means for incrementing a count value associated with the one of the plurality of web pages.

23. The system of claim 22, where the one or more computer devices further comprise:

means for assigning an order to the plurality of web pages based on the count values; and means for presenting the plurality of links to the web pages based on the assigned order.

24. The system of claim 21, where the one or more computer devices further comprise:

means for ranking the plurality of web pages based on at least one of: a number of previous accesses associated with the plurality of web pages, a number of web pages with a link pointing to one of the plurality of web pages, how closely the search query matches information on each of the plurality of web pages, or a user's history associated with accessing each of the plurality of web pages.

25. A method performed by one or more server devices, comprising:

storing web page information for each particular web site of a plurality of different web sites, the web page information, for the particular web site, including information regarding a plurality of web pages from a domain associated with the particular web site, the information regarding the plurality of web pages being stored, for each web page of the plurality of web pages, based on at least one factor that includes a quantity of times that the web page has been accessed by a plurality of users;

receiving a search query from a client device;

performing a search, based on the search query, to identify search results matching the search query, where a plurality of the search results correspond to web pages that are associated with a plurality of web sites, where at least two of the plurality of web sites are associated with different domains;

identifying one of the web pages as an identified web page that corresponds to one of the plurality of search results;

identifying a particular one of the plurality of web sites associated with the identified web page;

reading the web page information associated with the particular one of the plurality of web sites, the web page information identifying the plurality of web pages from the domain associated with the particular one of the plurality of web sites;

determining an order for the plurality of web pages based on the at least one factor associated with each of the plurality of web pages; and providing information regarding the plurality of search results for presentation on a display of the client device, where the information regarding the plurality of search results includes, for the one of the plurality of search results, links to the plurality of web pages from the domain associated with the particular one of the plurality of web sites.

26. The method of claim 25, wherein the at least one factor further comprises information regarding whether users scrolled through the plurality of web pages when the users accessed the plurality of web pages or exited the plurality of web pages without scrolling through the plurality of web pages.

27. The method of claim 25, where identifying the particular one of the plurality of web sites includes:

determining a web site identifier from information associated with the identified web page, the web site identifier corresponding to a home page of the particular one of the plurality of web sites, and storing the web site identifier as an index to other web pages associated with the particular one of the plurality of web sites.

* * * * *